April 7, 1925.                                                1,532,879
L. W. BUGBEE
PRISM MEASURING DEVICE IN PARALLEL SYSTEMS
Filed July 23, 1923
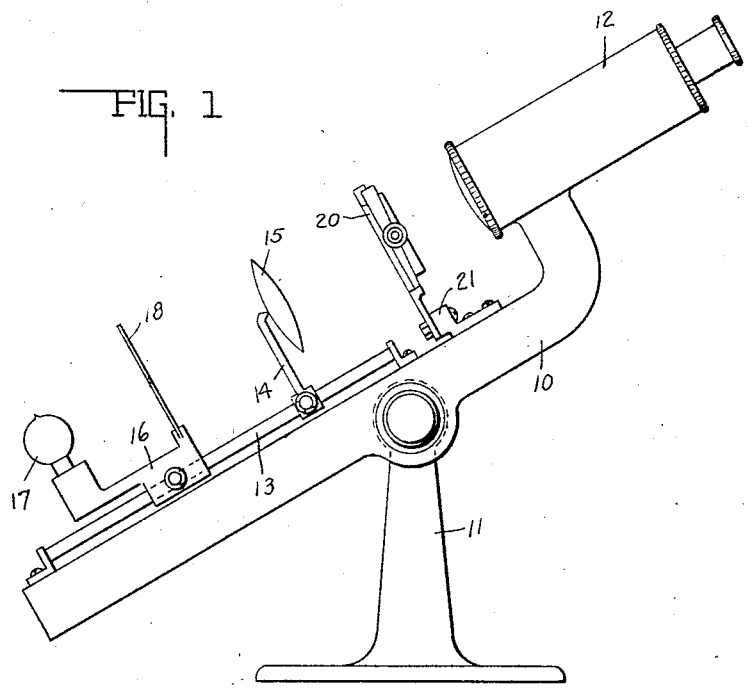
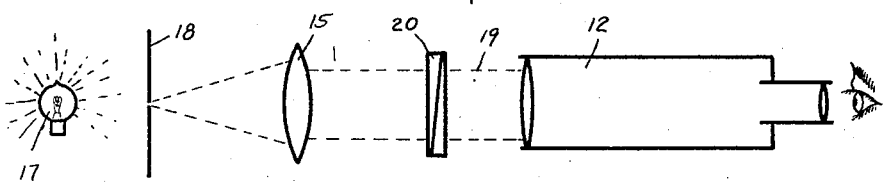
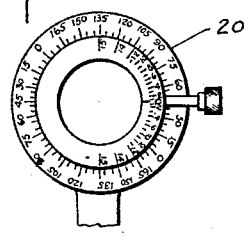
INVENTOR.
LUCIAN W. BUGBEE
BY
ATTORNEYS.

Patented Apr. 7, 1925.

1,532,879

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

PRISM-MEASURING DEVICE IN PARALLEL SYSTEMS.

Application filed July 23, 1923. Serial No. 653,369.

*To all whom it may concern:*

Be it known that I, LUCIAN W. BUGBEE, a citizen of the United States, and a resident of Indianapolis, county of Marion, and State of Indiana, have invented a certain new and useful Prism-Measuring Device in Parallel Systems; and I do hereby declare that the following is a full, clear, and exact description thereof, reference being had to the accompanying drawings, in which like numerals refer to like parts.

This invention relates to apparatus for measuring the prismatic power of a lens at the same time as the focal power thereof is being measured.

The chief feature of the invention consists in locating a prism measuring device in a lensometer which operates on the parallel ray system, where the parallel rays of light will pass through the prism measuring device. It may consist of an entirely new machine, or in combination with the lensometer previously made, of a prism measuring device associated therewith so that the parallel rays thereof will pass through the prism measuring device. The particular construction of lensometer or prism measuring device is immaterial excepting as hereinafter specified.

The full nature of the invention will be understood from the accompanying drawings and the following description and claims:

In the drawings, Figure 1 is a side elevation of said prism measuring apparatus. Fig. 2 is a diagrammatic presentation of the invention. Fig. 3 is a side elevation of a part of the prism measuring device herein shown.

This invention is not limited to any particular form of lensometer employing the parallel system, or to any particular construction of the prism measuring device combined therewith to form the total apparatus. What is shown herein is merely to illustrate the general nature of the invention and for that purpose well known forms of the two devices which are combined are employed and illustrated in combined apparatus, but the invention is in the combination of said devices in one apparatus for measuring the prismatic power of the lenses being measured by the lensometer, regardless of how carefully they may be made as to details of construction.

The lensometer 10 herein shown is of common form wherein there is a post 11 and a frame fulcrumed thereon between its ends carrying a telescope 12 at one end and a guide rod 13 at the other end. On this guide rod there is slidably mounted a holder 14 for the lense 15 being tested and a separate slidably mounted frame 16 which carries a lamp 17 and a target 18, which latter is located between the lamp and the lens holder 14. The details and purposes of these features of the construction of lensometer need not be here explained, as they are well known in the art.

In the passage of the light from the lens 15 to the telescope, the rays 19 are parallel and the prism measuring device 20 is, therefore, located so that said parallel rays will pass through the same. Said prism measuring device is of common and well known construction, carried by a bracket 21 on the frame of the apparatus, as shown, but so that the prism measuring device can be turned out of the way when not desired and be turned up into position when it is desired to measure the prismatic power of the lens.

In order that the eye of the observer may see the target 18 with the telescope focused for infinity, the traget must be in the principal focus of the lens 15 being tested. The distance between the lens 15 and the target 18 represents the focal length of the lens, said parts being relatively adjusted to each other so that said lens will focus on the target.

The prism measuring device 20 must work in the parallel rays system or be located so that the parallel rays between the telescope and the lens 15 will pass through the same, for otherwise the thickness of the glass in the prism measuring device will effect the accuracy of the result.

I claim, therefore, as new the introduction into a lens focusing instrument of a prism measuring device operating in a parallel ray system. In actual use, many modifications or refinements could be made which are well known to those skilled in the art and which need not be here specified. The prism measuring device should be adjustable to show not only the power of the prism, but also the position of the base apex line.

The invention claimed is:

1. Apparatus for measuring the powers of lenses, including an axially adjustable target, means for supporting the lens to be tested, a telescope focused for infinity, and a prism measuring device in the parallel ray system between the telescope and lens when supported on said lens holder, whereby both the focal and prismatic powers of a lens may be measured.

2. Apparatus for measuring the powers of lenses, including a target, means for supporting the lens to be measured, said two means being axially adjustable with relation to each other, a telescope focused for infinity and so positioned that the lens would be between the telescope and the target so parallel rays of light pass from the lens to the telescope, and a prism measuring device between the lens and the telescope through which said parallel rays pass.

3. Apparatus for measuring the powers of a lens, including an adjustable target, a telescope focused for infinity and directed towards said target, means for supporting the lens to be measured located between the telescope and target, whereby parallel rays of light will proceed from the lens to the telescope, and a prism measuring device between the lens and the telescope through which said parallel rays of light proceed when the apparatus is in proper adjustment to register the focal power of the lens.

4. Apparatus for measuring the powers of lenses, including a frame, a telescope thereon, a target axially adjustable, a lens holder adapted to hold a lens between the target and telescope and adjustable towards and away from the target, a prism measuring device, and means for mounting the prism measuring device in said frame so that it may be turned to a position between the lens and telescope and away from that position as desired.

5. Apparatus for measuring the powers of lenses, including a frame, a telescope mounted thereon, a target adjustable towards and from the telescope, a light connected with and beyond the target, a lens holder between the target and the telescope, and a prism measuring device removably mounted in between the position of the lens and the target whereby the parallel rays of the telescope will pass through the prism measuring device and the prismatic power as well as the focal power of the lens can be measured.

6. Apparatus for measuring the powers of lenses, including an axially adjustable target, a parallel ray system formed wholly or in part by the lens being tested, a telescope focused for infinity and directed towards the target, a prism measuring device mounted so as to be arcuately adjustable and thrown into and out of the parallel ray system and adjustable for power and graduated for prism diopters, the prism cell rotatably adjustable to locate the base apex line in degrees of arc.

In witness whereof, I have hereunto affixed my signature.

LUCIAN W. BUGBEE.